United States Patent [19]
Sparks et al.

[11] Patent Number: 5,481,924
[45] Date of Patent: Jan. 9, 1996

[54] METHOD AND APPARATUS FOR ASSESSING AND QUANTIFYING PULSATION INDUCED ERROR IN GAS TURBINE FLOW METERS

[75] Inventors: Cecil R. Sparks; Robert J. McKee, both of San Antonio, Tex.

[73] Assignee: Gas Research Institute, Chicago, Ill.

[21] Appl. No.: 92,270

[22] Filed: Jul. 15, 1993

Related U.S. Application Data

[63] Continuation-in-part of Ser. No. 708,357, May 31, 1991, abandoned.

[51] Int. Cl.⁶ .................................................. G01F 1/00
[52] U.S. Cl. ................... 73/861.03; 73/861.01; 364/571.01
[58] Field of Search ............... 73/3, 861.03, 861.77, 73/861.78, 863.81, 863.83

[56] References Cited

U.S. PATENT DOCUMENTS

4,864,869  9/1989  Glasheen ........................... 73/861.35

Primary Examiner—Richard E. Chilcot, Jr.
Assistant Examiner—R. L. Biegel

[57] ABSTRACT

A method and apparatus for identifying, quantifying and correcting turbine meter errors related to pulsation effects in a gas stream being measured. A turbine meter pulse rate output signal is monitored and abnormal pulse rate modulations in the signal are detected and used to indicate turbine meter measurement errors. The equation used to determine turbine error requires measurements of pulsation intensity over a desired frequency range. Because of the difficulty in measuring pulsation intensity at field sites, meter error is determined directly from rotor speed modulation data. Rotor speed modulation data is obtained and then quantitatively related to pulsation intensity using a rotor response model. Thus, meter error is determined directly from rotor speed modulation data, allowing on-site quantification and correction of errors.

18 Claims, 6 Drawing Sheets

METHOD AND APPARATUS FOR ASSESSING AND QUANTIFYING PULSATION INDUCED ERROR IN GAS TURBINE FLOW METERS

This is a continuation-in-part of application Ser. No. 07/708,357 filed on May 31, 1991 and titled "DETECTION OF ERRORS IN TURBINE METERS," now abandoned, which includes a common inventor and which is assigned to the same assignee as this application.

FIELD OF THE INVENTION

The present invention relates generally to systems for testing the operation of flow meters. More specifically, the present invention comprises an improved method for detecting, quantifying and correcting pulsation-induced errors in gas turbine flow meters using measured rotor response data.

BACKGROUND OF THE INVENTION

Turbine meters are commonly used for large volume gas flow measurement applications where accuracy and rangeability are essential. When calibrated, properly maintained, and used in steady flow conditions, turbine meters can provide reliable and accurate fluid metering. However, at many gas metering stations flow is not steady. Pulsations from operating compressors can be present and unsteady flow can result from control valves or natural resonant lengths within the piping system. These pulsations and unsteady flow conditions can cause errors in turbine meter registration.

U.S. patent application Ser. No. 07/708,357 filed on May 31, 1991 titled "DETECTION OF ERRORS IN TURBINE METERS" and assigned to the same assignee as the present application discloses a method and apparatus for monitoring the torsional oscillation of gas turbine meters which are induced by pulsating flow. The above-referenced application discloses how these torsional oscillation can be used to predict when meter errors are likely to occur. However, there is currently no method available for quantitatively assessing the magnitude of pulsation-induced errors at field turbine metering sites. There is also no available method for correcting meter readings to compensate for such errors.

Because of the growing use of turbine meters, there is a need for a method and apparatus for quantitatively assessing and correcting turbine meter errors due to unsteady flow. Ideally, the parameters used for determining pulsation-induced errors should not involve extra measurements such as velocity modulation or differential pressures, but should result from a signal already available to the user. Heretofore, there has not been a practical field method for diagnosing, quantifying, and correcting pulsation-induced turbine meter errors.

SUMMARY OF THE INVENTION

The present invention comprises a method and apparatus for identifying, quantifying, and correcting pulsation-induced flow measurement errors in gas turbine meters at field installations. The system of the present invention determines the existence of a turbine error and quantifies the error directly from the pulse signal output of the meter and does not require the measurement of additional flow parameters. The equation used to determine turbine error has heretofore required measurements of pulsation intensity over a relevant frequency range. Because of the difficulty in measuring pulsation intensity at field sites, meter error is determined directly from rotor speed modulation data according to the present invention.

The preferred embodiment of the invention detects an output signal produced by a turbine meter in response to the flow of a gas stream through the meter and monitors the torsional oscillation of the gas turbine meter rotors which are caused by the pulsating flow. The output signal produced by the turbine meter is normally in the form of a series of pulses produced by a transducer system in the turbine. A turbine meter pulse rate modulation signal is determined from the pulse-to-pulse time period of the pulse signals produced by the turbine. This pulse rate modulation signal is processed to remove any inherent modulation effects which are produced by imperfections in the pulse generating system of the turbine. Rotor oscillation data is then obtained using this pulse rate modulation signal.

The method then determines turbine meter error from a relationship which depends on pulsation velocity modulation amplitude and frequency. The obtained rotor speed modulation data is quantitatively related to pulsation intensity using a rotor response model. Thus, meter error is determined directly from rotor speed modulation data, allowing on-site quantification and correction of errors.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
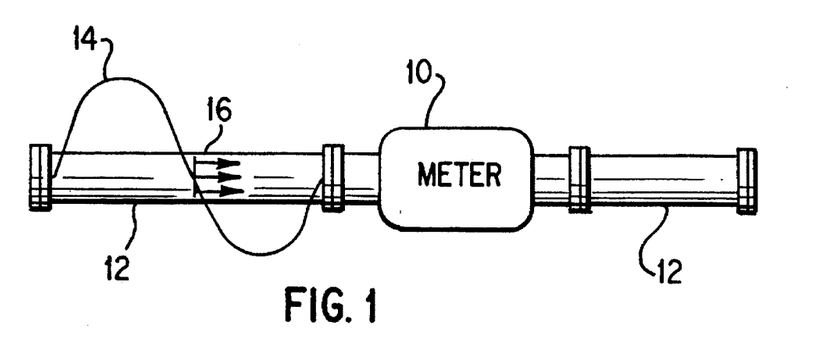
FIG. 1 illustrates a turbine meter for measuring gas flow in a pipeline.

Referring to FIG. 1, a turbine meter 10 is shown in fluid communication with a section of pipe 12 for transporting gas. A properly calibrated meter 10 provides an accurate indication of the gas flow volume, assuming that the flow of gas in the pipe 12 is steady and uniform. A number of factors, however, can create pulsations in the flow which cause significant inaccuracies in the measurement provided by the meter 10. For example, compressors operating in the gas stream can create pulsations. Pulsating or unsteady flow can also be created by control valves within the gas stream or by natural resonant lengths within the piping system.

The aggregate result of the aforementioned pulsation effects can be described as "modulation" of the otherwise steady flow of the gas within the pipeline. The waveform 14 shown in FIG. 1 is a general illustration of a velocity modulation waveform within the gas stream carried by the pipe 12. For purposes of illustration, the waveform 14 is shown as a sinusoid extending outside the boundaries of the pipe 12. The effects of the waveform 14, however, will be a series of wavefronts 16 within the pipeline 12, which cause unsteady flow of the gas and inaccuracies in turbine meter flow measurement.

Figure 2:
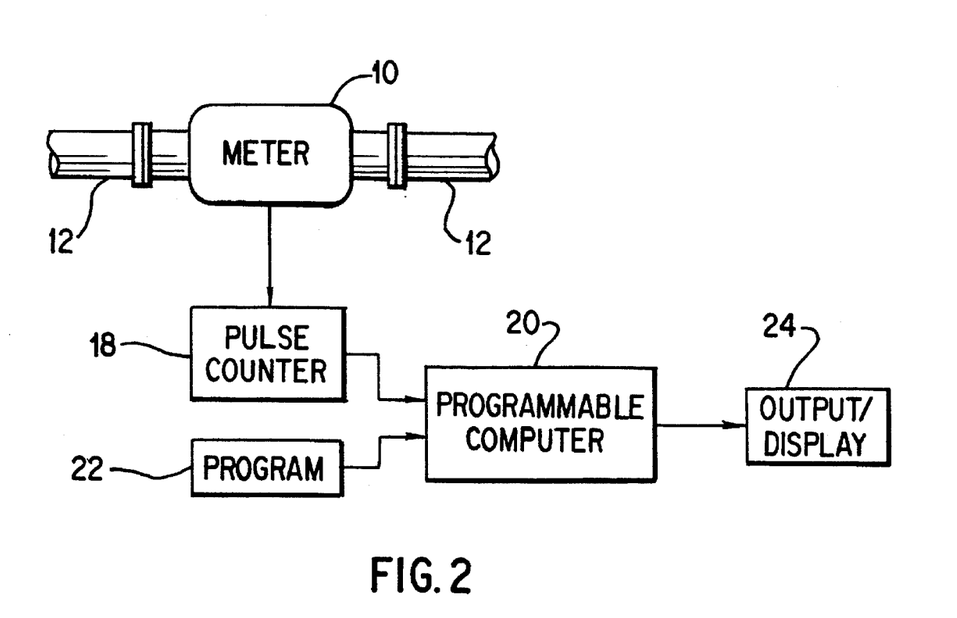
FIG. 2 illustrates a system which uses the pulse output signal from a turbine meter to measure gas flow in the pipeline.

FIG. 2 illustrates a system for using a turbine meter 10 to measure gas flow in a pipe 12. The turbine meter 10 comprises a system of transducers, known to those skilled in the art, for converting rotation of the turbine into a series of pulses. It is customary for turbine meter registration to be reported in terms of the number of pulses per unit volume of gas flow. The unit volume of gas flow at a particular pressure and temperature can be determined from the turbine pulse signal output by the pulse counter 18.

However, as discussed above, modulation of the gas flow creates errors in the measured flow rate of the turbine meter. These errors can be detected in the form of pulse rate modulation of the pulse output signal produced by the meter 10. The variation in pulse rate output can be detected as modulation in the period from one pulse to the next. Pulse rate modulation is defined as:

$$= \frac{(\text{Maximum period} - \text{Minimum period})}{2} * \text{Average Frequency}$$

Each turbine meter has a unique characteristic pulse rate modulation pattern at steady flow which is related to the meter's transducer system for producing pulses. Therefore in the preferred embodiment, the pulse count determined by the pulse counter 18 is provided to a programmable computer 20 which processes the pulse count signal from the pulse counter 18 and generates a pulse rate modulation signal based on the pulse-to-pulse spacing.

Figure 3A:
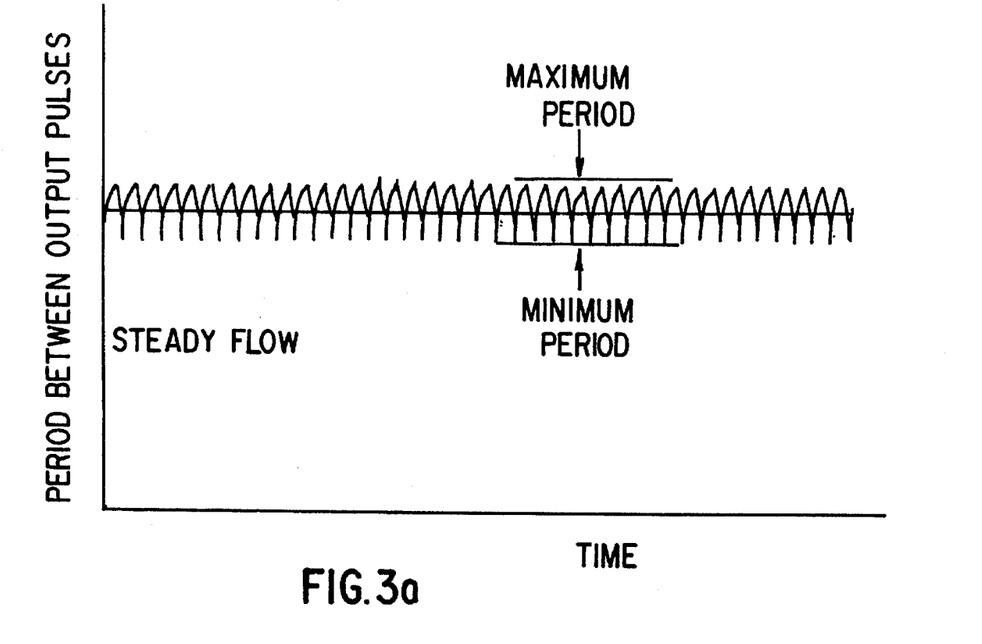
FIG. 3a is a graphical illustration of the pulse rate modulation signal produced by a turbine meter measuring the flow of gas under uniform, steady flow conditions.
Figure 3B:
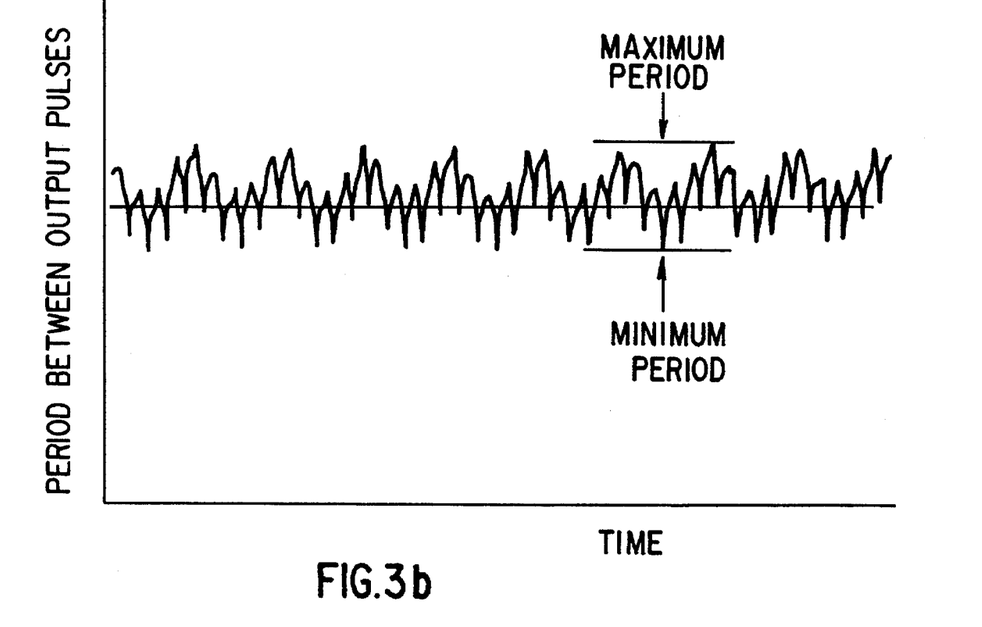
FIG. 3b is a graphical illustration of a pulse rate modulation signal produced by a turbine meter measuring the flow of an unsteady, pulsating gas stream.

FIG. 3a is a graphical illustration of the pulse rate modulation signal produced by a turbine meter measuring the flow of gas under uniform, steady flow conditions. In the preferred embodiment, this signal is obtained by measuring the pulse signal output while the turbine is spun at a constant rotational rate. Because of the inherent "signature" of this signal, however, it is possible to isolate and remove this signal from the composite pulse output signal by using signal processing techniques known to those skilled in the art. FIG. 3b is a graphical illustration of a pulse rate modulation signal produced by a turbine meter measuring the flow of an unsteady, pulsating gas stream. The effects of pulsation can be seen in the somewhat sinusoidal waveform impressed on the waveform of FIG. 3a.

The pulse rate modulation signals effectively measure the torsional oscillations of the rotor of the gas turbine meter. These oscillations are caused by pulsations in the gas stream, i.e., by flow velocity modulations which are one manifestation of pulsations. For more information on a method and apparatus for obtaining rotor speed modulation data, please see U.S. patent application Ser. No. 07/708,357 filed May 31, 1991, which is hereby incorporated by reference.

The computer 20 implements a method or program 22 according to the present invention which quantifies the amount of pulsation-induced turbine error using the obtained rotor torsional oscillation measurements. This method is discussed further below. The amount of error can be output or indicated as a message on the display 24, which can be in the form of a cathode ray tube or the like. Alternatively, the turbine meter error can be displayed directly on the display 24.

Determining Pulsation-Induced Error

The pulsation-induced error in turbine meters can be described as a function of pulsation intensity (I), physical characteristics of the meter [rotor inertia (J), slip factor ($\eta$), and mean effective rotor radius (r)], flowing gas density ($\rho$), and volume flow rate (Q). The theoretical equations which describe pulsation error are quite complex and require solution by numerical methods. An approximate solution to these equations is described in Haalman, A. "Pulsation Errors in Turbine Flowmeters," *Control Engineering*, pp. 89–91, 1965, which is hereby incorporated by reference. The approximate solution to these equations described by Haalman provides a reasonable match to the complex numerical solutions when flow pulsations are sinusoidal. The Haalman's equation is:

$$E = \frac{\Delta W_o}{V_o} = \frac{I^2}{2} \left[ \frac{w^2 \tau^2}{1 + w^2 \tau^2 - I^2/2} \right] \quad (1)$$

where:

$\Delta W_o$ = shift in average rotor speed due to pulsations; i.e., the difference between the average speed without pulsations and the average speed with pulsations;

$V_o$ = average pipe flow velocity;

$$I = \text{zero-to-peak intensity} \left( \frac{\Delta V}{2V_o} \right)$$

$\Delta V$ = peak-to-peak modulation amplitude of flow velocity;

w = pulsation frequency (rad/sec);

$\tau$ = rotor time constant;

$$E = \text{relative error} = \frac{\Delta W_o}{V_o}$$

The rotor time constant T is defined in Lee, W. F. Z., Kirik, M. J. and Bonner, J. A. "Gas Turbine Flowmeter Measurements of Pulsating Flow," *Journal of Engineering for Power*, Paper No. 74-WA/FM-1, 1974, which is hereby incorporated by reference. This reference describes the rotor time constant $\tau$ as follows:

$$\tau = \frac{J(1 + \eta)}{\rho Q r^2} \quad (2)$$

where:

J = rotor moment of inertia (supplied by manufacturer);

$\eta$ = rotor slip factor (supplied by manufacturer);

$\rho$ = flowing gas density (available at site);

Q = volume flow rate (approximate turbine speed);

r = mean effective radius of rotor blading center of action

Figure 4:
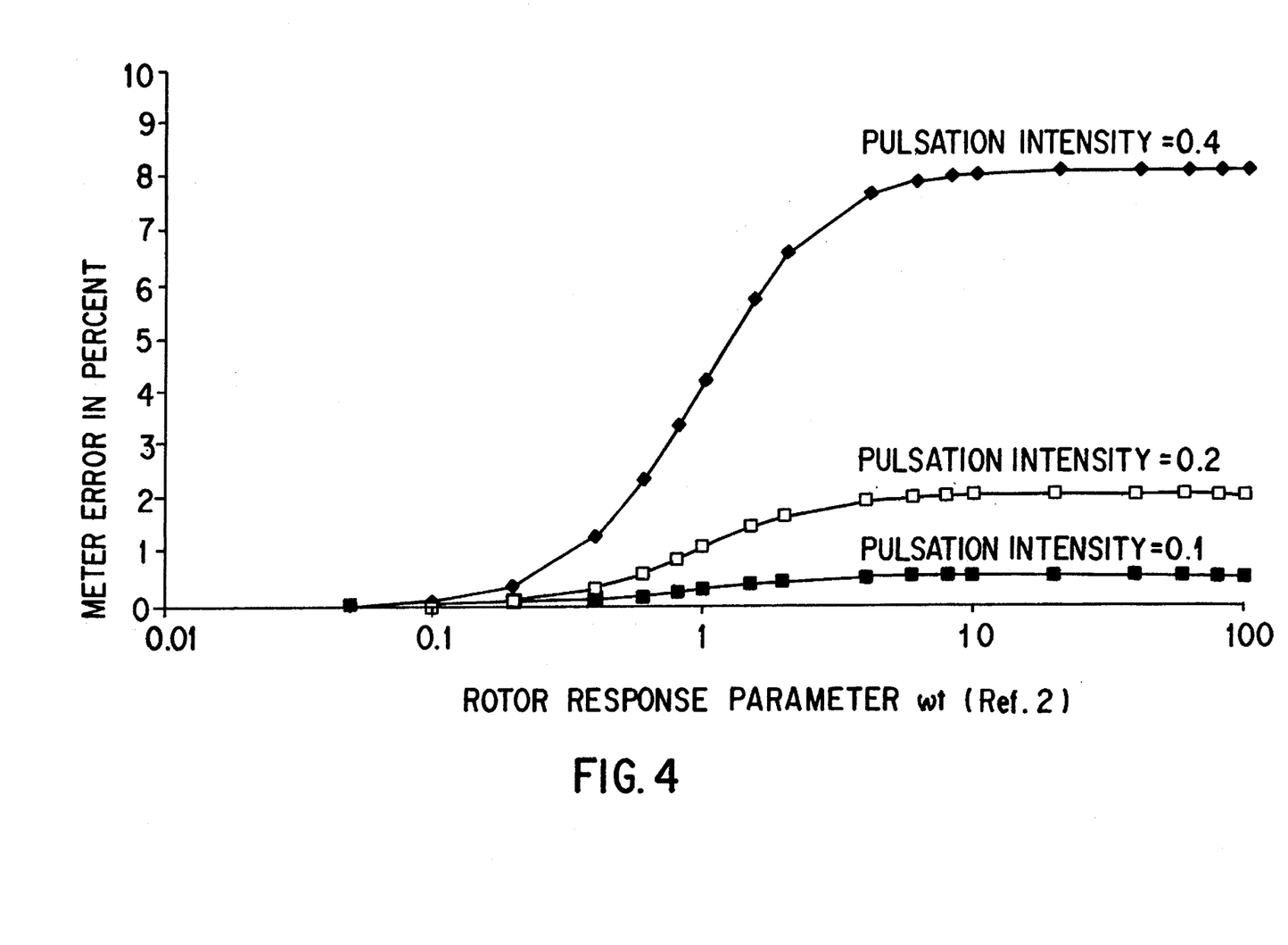
FIG. 4 is a graph illustrating predicted turbine meter error for three values of pulsation intensity.

FIG. 4 illustrates the results of turbine meter error computations using Equation (1) for a range of w$\tau$ (rotor response) and I (pulsation intensity) values. Computations performed by the authors of the Lee Reference show that these curves compare well with numerical solutions of the basic turbine meter equation. As such, they validate the use of Haalman's equation as a basis for calculating turbine meter error as a function of measured field conditions (I, $\rho$, Q) so long as properties of the rotor (J,η,r) are known. For more information on these properties, please see McKee, R. J., "Pulsation Effects on Gas Turbine Meters," Gas Research Institute Topical Report GRI-92/0220 (1993) which is hereby incorporated by reference.

However, prior art methods are inadequate as a practical basis for identifying pulsation problems and assessing their magnitudes at field metering sites. For example, measurement of pulsation intensity (I) at the meter location requires the use of hot wire or laser doppler anemometry systems which are too complex for routine diagnostic purposes, especially if diagnoses are to be performed by gas measurement technicians. On the other hand, the dynamic response of Pitot tubes is not sufficient to accurately reproduce pulsating flow conditions over the required frequency range.

Rotor speed modulation data, however, provides a convenient source of data for diagnosing pulsation effects on turbine meter rotor speed and registration, if rotor response can be quantitatively related to pulsation intensity. A rotor response model is described below which defines rotor speed modulation as a function of pulsation intensity, and this equation is combined with Haalman's approximate equation (Equation 1) to relate meter registration error directly to rotor speed modulation data.

Rotor Torsional Response Model

In commercial gas turbine meters, rotor speed is linearly related to volume flow rate under steady flow conditions. Any modulation of flow rate ($\Delta V$) is therefore linearly related to rotor speed modulation amplitude ($\Delta W$) so long as these modulations are at low frequencies (i.e., below the torsional cutoff frequency of the turbine meter rotor). At low frequencies, therefore, the rotor speed modulation ratio is numerically equal to the flow velocity modulation ratio; i.e., $$\frac{\Delta W}{W_o} = \frac{\Delta V}{V_o}$$

The turbine meter transfer function G (output response divided by input flow) is defined as $$G = \frac{\Delta W}{W_o} \div \frac{\Delta V}{V_o}$$

When pulsation frequencies are above rotor cutoff, (i.e., when $w>1/\tau$) rotor speed modulations no longer track velocity modulations, and rotor modulation amplitude decreases with increasing pulsation frequency at a rate of 6 dB/octave. The generalized transfer function for rotor response is of the form:

$$G = \frac{\Delta W/W_o}{\Delta V/V_o} = \left[ \frac{1}{1+jw\tau} \right] \quad (3)$$

where:

$$j = \sqrt{-1}$$

and denotes a quadrature vector direction.

If the expression for $\tau$ (Equation 2) is substituted into Equation 3, then:

$$G = \frac{\Delta W/W_o}{\Delta V/V_o} = \frac{1}{\left[ 1+\frac{jwJ(1+\eta)}{r^2 \rho Q_o} \right]} \quad (4)$$

The transfer functions given in Equations 3 and 4 are complex terms containing real and imaginary components which define rotor response amplitude and phase. Since only error magnitude information is desired, the amplitude of the transfer function can be defined as follows:

$$G = \left[ \frac{\Delta W/W_o}{\Delta V/V_o} \right] = \left[ \frac{1}{(1+w^2\tau^2)^{0.5}} \right] \quad (5)$$

Equations 4 and 5 show that rotor torsional response (like pulsation error) can be defined in terms of Pulsation Intensity (I), frequency (w), and rotor time constant, $\tau$. It can be seen from Equation 5, for example, that for very small values of $w\tau$ (i.e., $w\tau<<1$) that $|G|=1$, whereas when $w\tau>>1$, then $$|G|=(1/w\tau).$$

Figure 5:
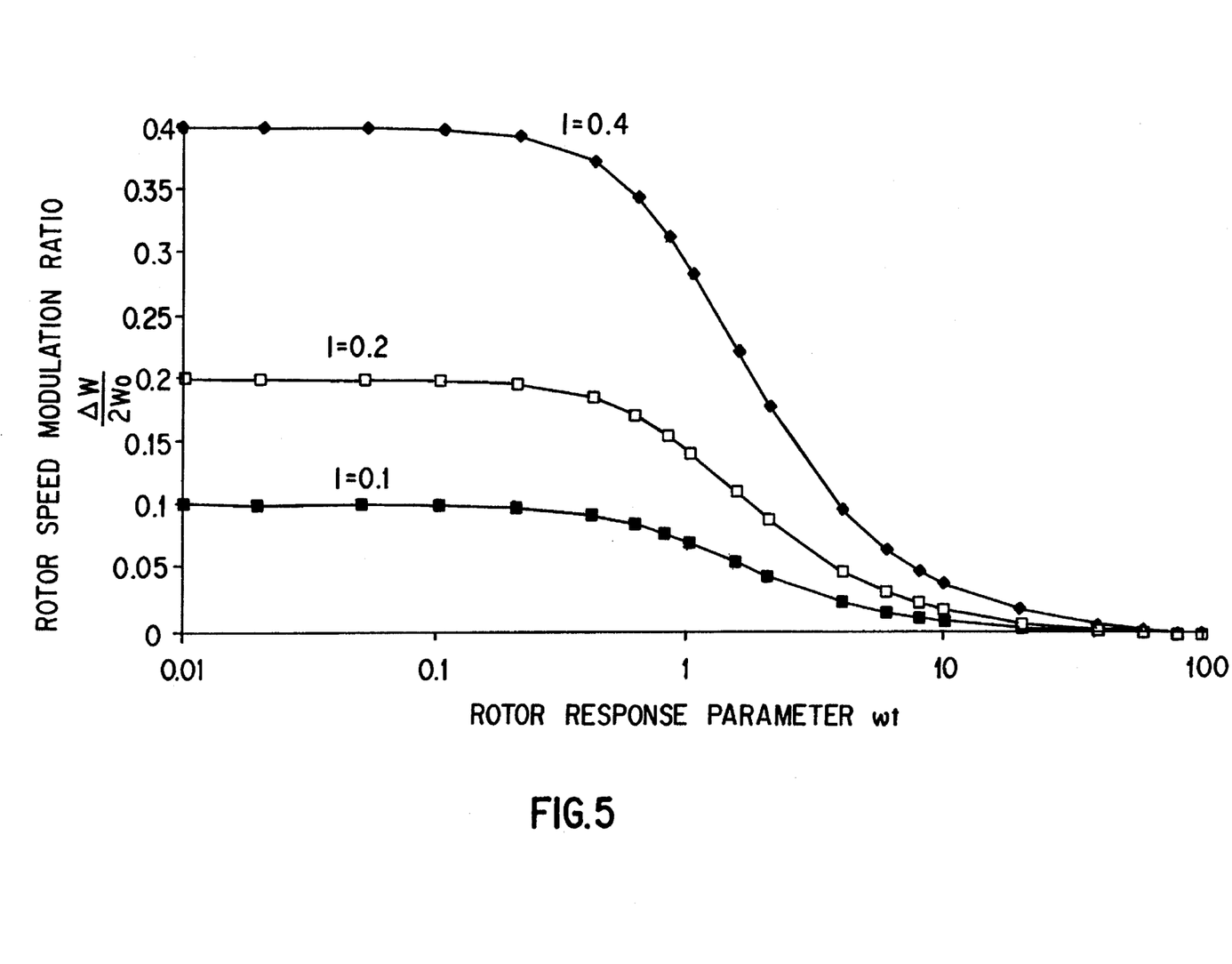
FIG. 5 is a graph illustrating predicted rotor modulation ratios for three values of pulsation intensity.

FIG. 5 is a plot of Equation 4 for a typical 4" single rotor gas turbine meter, showing rotor speed modulation ratio as a function of the rotor response parameter ($w\tau$) for several values of pulsation intensity. If we define intensity as in the Haalman reference:

$$I = \frac{\Delta V}{2V_o}.$$

where:

$\Delta V$=peak-to-peak amplitude of the velocity modulation waveform $V_o$=average velocity Then rotor modulation ratio must also be defined as the zero peak value; i.e., $$\text{speed modulation ratio} = \frac{\Delta W}{2W_o}$$

CORRELATION

Figure 6:
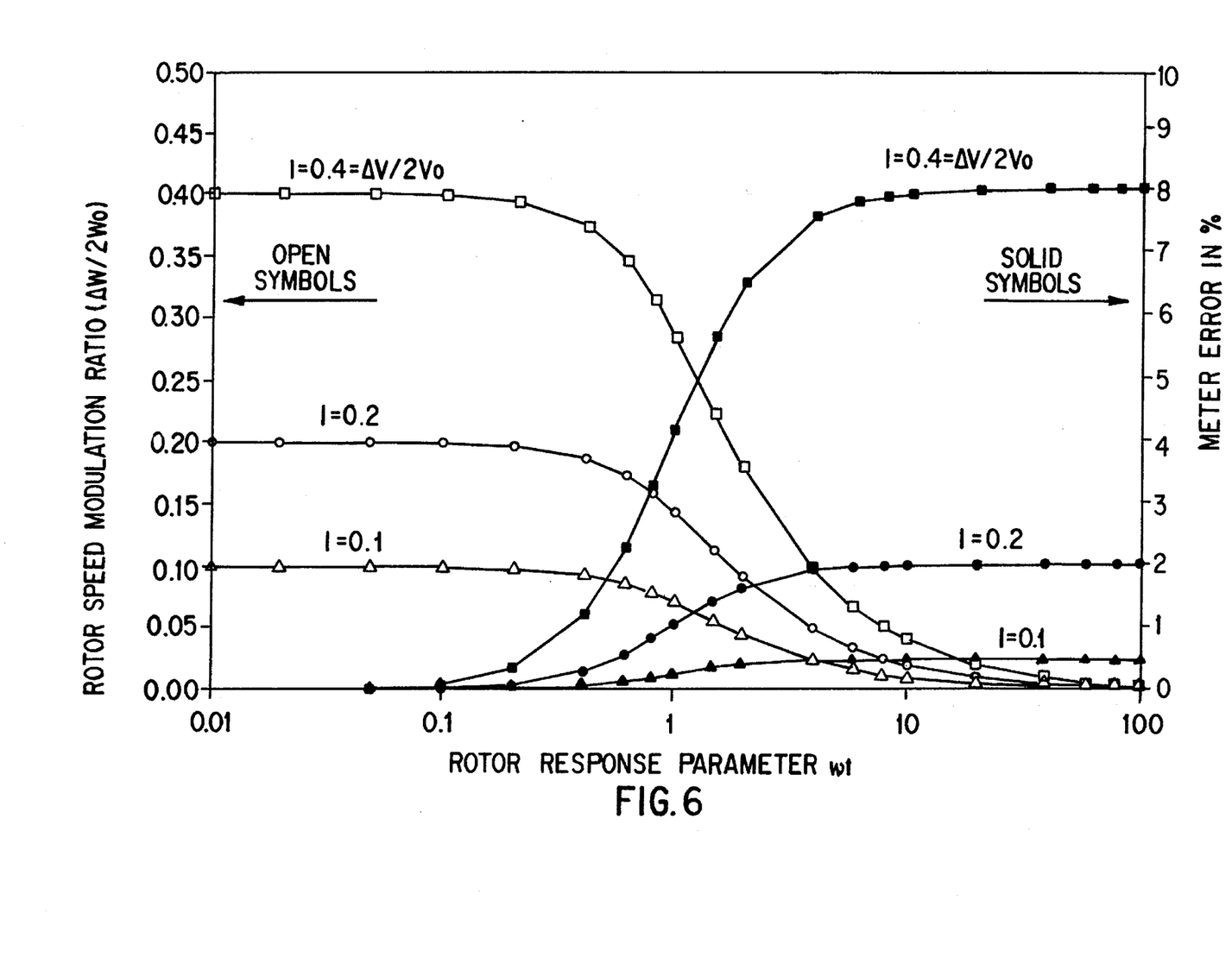
FIG. 6 is a graph comparing predicted rotor modulation ratio and predicted reading error for three values of pulsation intensity.

FIG. 6 superimposes the plot of rotor speed response (FIG. 5) and rotor error (FIG. 4) versus $w\tau$ for several intensity values (I=0.10, 0.20, and 0.40). It can be seen that both rotor response and meter error vary with I and $w\tau$, but that the form of these variations is substantially different. If field measurements of $\Delta W/2W$ are to be used to predict error, a correlation equation is required to reconcile the two data sets.

Mathematically, the process of developing this correlation (i.e., of analytically defining rotor response as a function of I and $w\tau$) now becomes quite simple. Remembering that $$I = \frac{\Delta V}{2V^o}$$

Equation 5 can be solved in terms of I:

$$I = \frac{1}{2} \left[ \frac{\Delta W}{W_o} \right] (1 + w^2\tau^2)^{0.5}$$

Substituting this expression for I into Haalman's approximate equation (Equation 1), we have meter error in terms of rotor modulation ratio:

This equation provides a basis for defining meter error directly from rotor speed modulation data taken with the $$E = \frac{1}{2} \left[ \frac{\Delta W}{2w_o} \right]^2 (1 + w^2\tau^2) \left[ \frac{w^2\tau^2}{1 + w^2\tau^2 - \frac{1}{2} \left( \frac{\Delta W^2}{2W_o} \right)(1 + w^2\tau^2)} \right]$$

instrumentation system described hereinabove. As such, it provides a convenient basis for identifying and quantifying meter error using data which is easily accessible from the turbine meter itself; i.e., without additional complex sensors or intrusion into the gas stream. While some additional rotor design information is required to define rotor time constant τ, such information is readily available from the meter manufacturer. Similarly, Q and ρ data are available in the normal turbine meter measurement process (i.e., from rotor speed and system pressure and temperature). No additional information regarding pulsation amplitude or frequency is required (dynamic pressure, flow velocity, pulsation intensity, etc).

Figure 7:
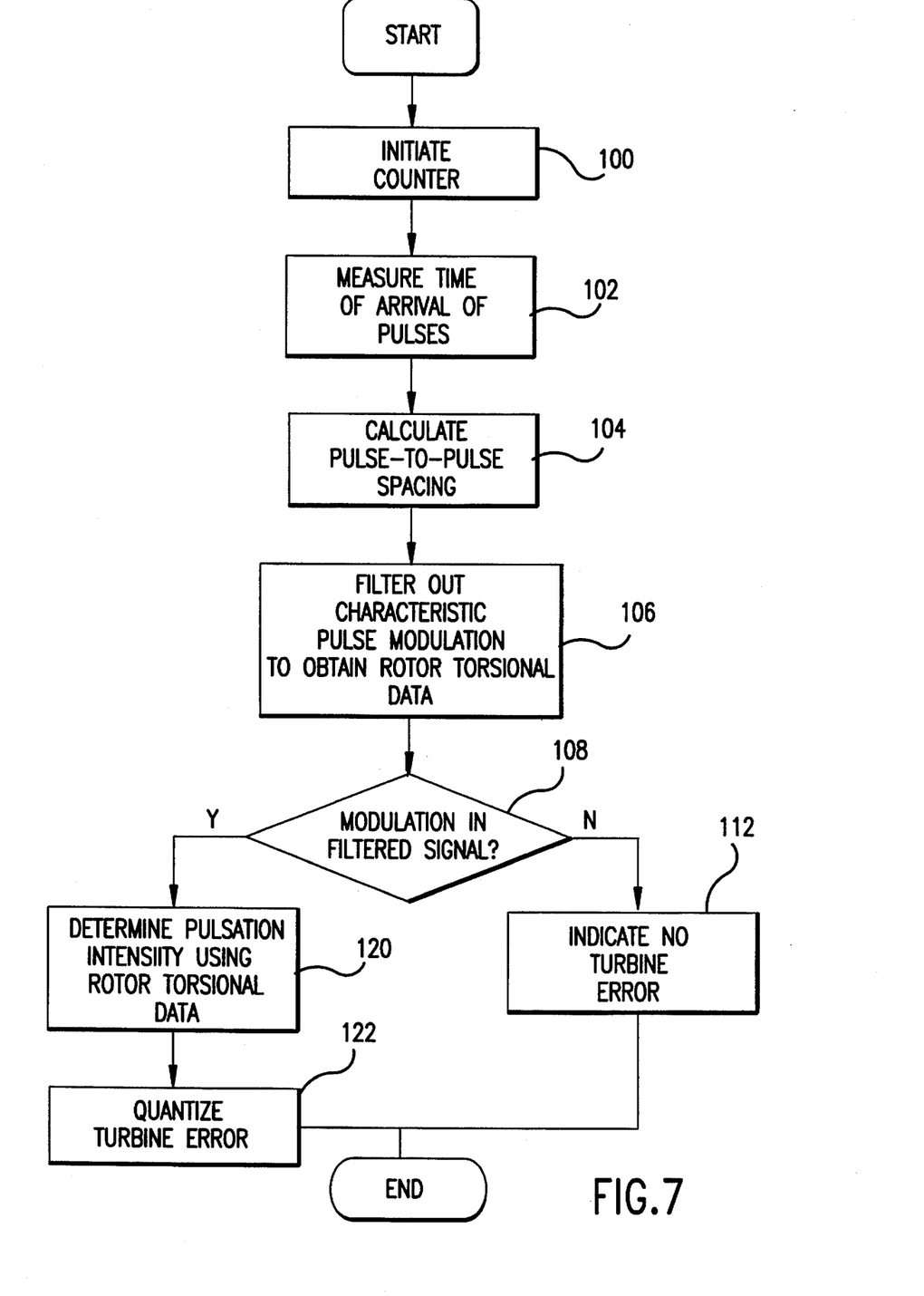
FIG. 7 is a flow chart of the processing steps implemented in the system of the present invention to determine and quantify pulsation-induced meter error.

FIG. 7 is a flowchart diagram illustrating the processing steps implemented by the computer 20 to gather rotor speed modulation data and quantitatively relate this data to pulsation intensity. Using these techniques, meter error can be determined directly from rotor speed modulation data. In step 100, the counter 18, shown in FIG. 2, is initiated. In step 102, the time of arrival of the pulses is determined. This can be accomplished through the use of a "time-stamping" algorithm known to those skilled in the art. In step 104, the pulse-to-pulse spacing is calculated and a turbine meter pulse modulation signal is constructed therefrom. In step 106, the characteristic pulse rate modulation related to the turbine meter is removed, using signal processing techniques known in the art, to provide a filtered turbine meter response signal. This was discussed previously with regard to FIGS. 3a and 3b. Also, as previously discussed, the filtered pulse rate modulation signal is essentially equivalent to the rotor torsional or modulation data. In step 108, the filtered turbine meter response signal is tested for the existence of modulation. If this test indicates the existence of pulse rate modulation, then a "meter error" is indicated. However, if the test in step 108 indicates that there is no modulation, a "no error" indication is provided in step 112.

If meter error is indicated in step 108, then in step 120 the method determines the pulsation intensity using the obtained rotor modulation data as previously described. In step 122 the method determines the predicted registration or meter reading error using the pulsation intensity determined in step 122. This can be illustrated by the graph of FIG. 6 whereby, knowing the rotor modulation ratio, the pulsation intensity I and hence the amount of meter error can be determined. This error can then be used in adjusting the meter reading to ascertain a more correct reading.

As noted previously, the technique is based on sinusoidal wave forms. This however, is not a serious limitation for most field applications of practical concern for the following reasons:

1) Most serious pulsation problems at field measurement sites involve pulsation waveforms which are predominantly pure tone (single frequency). When multiple frequencies do exist, it is rare that the amplitude of more than one frequency is strong enough to contribute significant error components. In many cases, an acoustic resonance within the piping is the basic cause for high pulsation levels, although unfiltered compressors (typical in gas gathering systems) can produce strong pulsations at one or two times crankshaft speed (depending upon whether they are single or double acting. Such large amplitude single pulsation frequencies are dominately sinusoidal.

2) Complex pulsation wave forms can be described as a series of harmonic components using spectral analyzers or FFT routines. It may be possible, therefore, to simply combine the error contribution from each frequency component. This is the technique used for defining pulsation-induced error at orifice meters, where it can be shown analytically and experimentally that total pulsation error is the linear summation of error contributions from each frequency component.

Therefore, the method according to the present invention utilizes the magnitude of the torsional oscillations to quantitatively assess pulsation-induced error in turbine meter registration (reading).

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A system for detecting and quantifying pulsation-induced errors in a turbine meter measuring gas flow in a pipe, comprising:

a turbine meter;

transducer means coupled to said turbine meter for producing an output signal correlatable with the flow of a gas stream through said turbine meter; and processing means for processing said output signal to obtain an amount of pulsation-induced error in the flow measurement provided by said meter.

2. The system according to claim 1, wherein said turbine meter includes a rotor; and wherein said processing means determines the magnitude of torsional oscillations of said gas turbine meter rotor to quantitatively determine said pulsation-induced error.

3. The system according to claim 2, wherein said processing means determines said error according to the equation:

$$E = \frac{\Delta W_o}{V_o} = \frac{I^2}{2} \left[ \frac{w^2\tau^2}{1 + w^2\tau^2 - I^2/2} \right] \quad (1)$$

where:

$\Delta W_o$=shift in average rotor speed due to pulsations; i.e., the difference between the average speed without pulsations and the average speed with pulsations;

$V_o$=average pipe flow velocity;

$$I = \text{zero-to-peak intensity}\left(\frac{\Delta V}{2V_o}\right)$$

$\Delta V$=peak-to-peak modulation amplitude of flow velocity;
w=pulsation frequency (rad/sec);
$\tau$=rotor time constant;

$$E = \text{relative error} = \frac{\Delta W_o}{V_o}.$$

4. The system according to claim 3, wherein said processing means determines said pulsation intensity according to the equation:

$$I = \frac{1}{2}\left[\frac{\Delta W}{W_o}\right](1 + w^2\tau^2)^{0.5}.$$

5. The system according to claim 2, said output signal comprising a series of pulses correlatable with the flow of said gas stream through said turbine meter.

6. The system according to claim 5, said means for processing said output signal comprising means for detecting said pulses and for generating a pulse rate modulation signal therefrom.

7. The system according to claim 6, said pulse rate modulation signal comprising a first component representing inherent modulation caused by said transducer means and a second portion representing modulation effects caused by unsteady or pulsating flow of said gas stream.

8. The system according to claim 7, said means for processing said output signal comprising means for removing said first component of modulation from said pulse rate modulation signal to generate a processed pulse rate modulation signal comprising only said second portion of modulation effects.

9. A method for quantitatively assessing the magnitude of pulsation induced errors in a gas turbine meter, comprising the steps of:

passing a stream of gas through a turbine meter;

producing an output signal correlatable with the flow of said stream of gas through said turbine meter; and processing said output signal to obtain an indication of a pulsation-induced error in the flow measurement provided by said meter.

10. The method of claim 9, wherein said turbine meter includes a rotor;

said step of processing further comprising: determining the magnitude of torsional oscillations of said gas turbine meter rotor; and quantitatively determining said pulsation-induced error using said rotor torsional oscillation magnitude.

11. The method of claim 10, wherein said step of processing quantitatively determines said pulsation-induced error according to the equation:

$$E = \frac{\Delta W_o}{V_o} = \frac{I^2}{2}\left[\frac{w^2\tau^2}{1 + w^2\tau^2 - I^2/2}\right] \quad (1)$$

where:
$\Delta W_o$=shift in average rotor speed due to pulsations; i.e., the difference between the average speed without pulsations and the average speed with pulsations;

$V_o$=average pipe flow velocity;

$$I = \text{zero-to-peak intensity}\left(\frac{\Delta V}{2V_o}\right)$$

$\Delta V$=peak-to-peak modulation amplitude of flow velocity;
w=pulsation frequency (rad/sec);
$\tau$=rotor time constant;

$$E = \text{relative error} = \frac{\Delta W_o}{V_o}.$$

12. The method of claim 11, wherein said step of processing determines said pulsation intensity according to the equation:

$$I = \frac{1}{2}\left[\frac{\Delta W}{W_o}\right](1 + w^2\tau^2)^{0.5}.$$

13. The method according to claim 10, said output signal comprising a series of pulses produced by a transducer means, said pulses being correlatable with the flow of said gas stream through said turbine meter.

14. The method according to claim 13, said step of processing said output signal further comprising the step of detecting said pulses and generating a pulse rate modulation signal therefrom prior to said step of processing.

15. The method according to claim 14, said pulse rate modulation signal comprising a first component representing inherent modulation caused by said transducer means and a second portion representing modulation effects caused by unsteady or pulsating flow of said gas stream.

16. The method according to claim 15, said step of processing said output signal further comprising the steps of removing said first component of modulation from said pulse rate modulation signal to generate a processed pulse rate modulation signal comprising only said second portion of modulation effects after said steps of detecting and generating.

17. A system for detecting and quantifying pulsation-induced errors in a turbine meter measuring gas flow in a pipe, comprising:

a turbine meter including a rotor;

transducer means coupled to said turbine meter for producing an output signal correlatable with the flow of a gas stream through said turbine meter; and processing means for processing said output signal to obtain an amount of pulsation-induced error in the flow measurement provided by said meter;

wherein said processing means determines the magnitude of torsional oscillations of said gas turbine meter rotor to quantitatively determine said pulsation-induced error; and wherein said processing means determines said error according to the equation:

$$E = \frac{\Delta W_o}{V_o} = \frac{I^2}{2}\left[\frac{w^2\tau^2}{1 + w^2\tau^2 - I^2/2}\right] \quad (1)$$

where:
$\Delta W_o$=shift in average rotor speed due to pulsations; i.e., the difference between the average speed without pulsations and the average speed with pulsations;

$V_o$=average pipe flow velocity;

$$I = \text{zero-to-peak intensity} \left( \frac{\Delta V}{2V_o} \right)$$

$\Delta V$=peak-to-peak modulation amplitude of flow velocity;
w=pulsation frequency (rad/sec);
τ=rotor time constant;

$$E = \text{relative error} = \frac{\Delta W_o}{V_o}$$

and;
wherein said processing means determines said pulsation intensity according to the equation:

$$I = \frac{1}{2} \left[ \frac{\Delta W}{W_o} \right] (1 + w^2\tau^2)^{0.5}.$$

18. A method for quantitatively assessing the magnitude of pulsation induced errors in a gas turbine meter, comprising the steps of:
- passing a stream of gas through a turbine meter, wherein said turbine meter includes a rotor;
- producing an output signal correlatable with the flow of said stream of gas through said turbine meter; and
- processing said output signal to obtain an indication of a pulsation-induced error in the flow measurement provided by said meter;
- wherein said step of processing comprises:
  - determining the magnitude of torsional oscillations of said gas turbine meter rotor; and
  - quantitatively determining said pulsation-induced error using said rotor torsional oscillation magnitude;
- wherein said step of processing quantitatively determines said pulsation-induced error according to the equation:

$$E = \frac{\Delta W_o}{V_o} = \frac{I^2}{2} \left[ \frac{w^2\tau^2}{1 + w^2\tau^2 - I^2/2} \right] \quad (1)$$

where:
$\Delta W_o$=shift in average rotor speed due to pulsations; i.e., the difference between the average speed without pulsations and the average speed with pulsations;
$V_o$=average pipe flow velocity;

$$I = \text{zero-to-peak intensity} \left( \frac{\Delta V}{2V_o} \right)$$

V=peak-to-peak modulation amplitude of flow velocity;
w=pulsation frequency (rad/sec);
τ=rotor time constant;

$$E = \text{relative error} = \frac{\Delta W_o}{V_o}$$

and;
wherein said step of processing determines said pulsation intensity according to the equation:

$$I = \frac{1}{2} \left[ \frac{\Delta W}{W_o} \right] (1 + w^2\tau^2)^{0.5}.$$

* * * * *